US006271646B1

(12) United States Patent
Evers et al.

(10) Patent No.: US 6,271,646 B1
(45) Date of Patent: Aug. 7, 2001

(54) BATTERY CELL BY-PASS CIRCUIT

(75) Inventors: Jeffrey Evers, Parker; Ronald V. Gelger, Denver, both of CO (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/610,351

(22) Filed: Jul. 5, 2000

(51) Int. Cl.[7] .................................................. H02J 7/00
(52) U.S. Cl. ............................................. 320/122; 320/120
(58) Field of Search .................................... 320/122, 119, 320/120, 132, 136, 116, 117, 118

(56) References Cited

U.S. PATENT DOCUMENTS

| 5,049,804 | 9/1991 | Hutchings | 320/110 |
|---|---|---|---|
| 5,164,652 | 11/1992 | Johnson et al. | 320/106 |
| 5,420,493 | 5/1995 | Hargadon et al. | 320/106 |
| 5,539,299 | 7/1996 | Fernadez et al. | 320/163 |
| 5,818,199 | 10/1998 | Beard | 320/116 |
| 5,850,136 | * 12/1998 | Kaneko | 320/122 |
| 5,853,908 | 12/1998 | Okutoh | 429/7 |
| 5,982,145 | 11/1999 | Eguchi | 320/128 |
| 6,025,696 | * 2/2000 | Lenhart et al. | 320/122 |

* cited by examiner

Primary Examiner—Peter S. Wong
Assistant Examiner—Lawrence Luk
(74) Attorney, Agent, or Firm—John H. Kusmiss

(57) ABSTRACT

The invention is a circuit and method of limiting the charging current voltage from a power supply net work applied to an individual cell of a plurality of cells making up a battery being charged in series. It is particularly designed for use with batteries that can be damaged by overcharging, such as Lithium-ion type batteries. In detail, the method includes the following steps: 1) sensing the actual voltage level of the individual cell; 2) comparing the actual voltage level of the individual cell with a reference value and providing an error signal representative thereof; and 3) by-passing the charging current around individual cell necessary to keep the individual cell voltage level generally equal to a specific voltage level while continuing to charge the remaining cells. Preferably this is accomplished by by-passing the charging current around the individual cell if said actual voltage level is above the specific voltage level and allowing the charging current to the individual cell if the actual voltage level is equal or less than the specific voltage level. In the step of bypassing the charging current, the by-passed current is transferred at a proper voltage level to the power supply. The by-pass circuit a voltage comparison circuit is used to compare the actual voltage level of the individual cell with a reference value and to provide an error signal representative thereof. A third circuit, designed to be responsive to the error signal, is provided for maintaining the individual cell voltage level generally equal to the specific voltage level. Circuitry is provided in the third circuit for bypassing charging current around the individual cell if the actual voltage level is above the specific voltage level and transfers the excess charging current to the power supply net work. The circuitry also allows charging of the individual cell if the actual voltage level is equal or less than the specific voltage level.

6 Claims, 2 Drawing Sheets

CIRCUIT LEVEL BLOCK DIAGRAM

CIRCUIT LEVEL BLOCK DIAGRAM

BATTERY CELL BY-PASS CIRCUIT

BACKGROUND OF THE INVENTION

1. Field of the Invention

The invention relates to the filed of charging systems for batteries and, in particular, to a charging system that prevents over charging of individual cells of a battery composed of a plurality of cells in series.

2. Description of Related Art

Certain types of batteries, such as Lithium-ion batteries are subject to damage if over charged. If there is a single battery cell in use, charging presents no problem. A simple charging system can be used that senses when the cell is fully charged and thereafter trickle charging are used to maintain the charge. One type of system switches off the charging current; for example U.S. Pat. No. 5,539,299 "Protection Switch For A Battery Powered Device" by J. M. Ferandez, U.S. Pat. No. 5,853,908 "Protection Device For Secondary Batteries" by T. Okutoh and U.S. Pat. No. 5,892,145 "Battery Pack Unit, Control Method Therefore, Electronic Equipment Driven Power Supplied From Same Battery Pack Unit, And Recording Medium On Which Program For Controlling The Same Battery Pack Unit Is Recorded" by Y. Eguchi.

U.S. Pat. No. 5,049,804 "Universal Battery Charging System And A Method" by P. D. Hutchings and U.S. Pat. No. 5,164,652 "Method And Apparatus For Determining Battery Type And Modifying Operating Characteristics" by R. M. Johnson, et al., and U.S. Pat. No. 5,420,493 "Power Supply And Battery Charger" by A. Hargadon, et al. all disclose charging systems that can be used to charge various types of batteries. There are literally hundreds of battery charger designs for charging a single battery cell. However, when a battery is composed of a plurality of cells in series, such systems will not prevent an individual cell from being over charged, especially when the battery is composed of a plurality of Lithium-ion cells.

U.S. Pat. No. 5,969,502 "Battery Charger Capable Of Independently Charging Electromagnetic Cells". P. Beard discloses a charging system for a pair of cells arranged in series wherein the system independently controls charging of each cell. A resistor limits the current to the battery and a voltage equalizer is used to balance the cell voltage between the cells during charging. However, while this will work for a pair of cells in series it is not useful for a higher number of cells.

In U.S. patent application Ser. No. 09/493,581 "Battery Cell By-Pass Circuit" by S. W. Mumaw, et al. filed Jan. 28, 2000 (common assignee), an approach is disclosed wherein a system for limiting the charging voltage applied to an individual cell of a series of cells forming a battery, the cells being charged in series It includes a voltage detection circuit to sense the actual voltage level of the individual cell. A voltage comparison circuit is used to compare the actual voltage level of the individual cell with a reference value and to provide an error signal representative thereof. A third circuit, designed to be responsive to the error signal, is provided for bypassing charging current from the individual cell if the actual voltage level is above the specific voltage level and converts the excess charging current to heat. The circuitry also allows charging of the individual cell if the actual voltage level is equal or less than the specific voltage level. The disadvantage of this circuit is that no attempt is made to reclaim the energy by-passed around the individual cell.

Thus, it is a primary object of the invention to provide a circuit for preventing the overcharging of an individual cell of a battery composed of a plurality of cells in series.

It is another primary object of the invention to provide a circuit for preventing the overcharging of an individual cell of a battery composed of a plurality of cells in series wherein each individual cell is provided with a charging by-pass circuit.

It is a further object of the invention to provide a circuit, which allows current to by-pass all cells at a specific state of charge with the purpose of equalizing the state of charge of each individual cell with the battery.

It is a further object of the invention to provide a circuit for preventing the overcharging of an individual cell of a battery composed of a plurality of cells in series wherein each individual cell is provided with a charging by-pass circuit and where the by-pass circuit reclaims the energy by-passed around the cell or cells.

SUMMARY OF THE INVENTION

The invention is a circuit and method of limiting the charging current from a power supply net work applied to an individual cell of a plurality of cells making up a battery being charged in series. It is particularly designed for use with batteries that can be damaged by overcharging, such as Lithium-ion type batteries. In detail, the method includes the following steps:

1. sensing the actual voltage level of the individual cell;
2. comparing the actual voltage level of the individual cell with a reference value and providing an error signal representative thereof; and
3. by-passing the charging current around individual cell necessary to keep the individual cell voltage level generally equal to a specific voltage level while continuing to charge the remaining cells. Preferably this is accomplished by by-passing the charging current around the individual cell if said actual voltage level is above the specific voltage level and allowing the charging current to the individual cell if the actual voltage level is equal or less than the specific voltage level. In the step of bypassing the charging current, the by-passed current is transferred at a proper voltage level to the power supply.

The by-pass circuit for limiting the charging current applied to an individual cell of a series of cells forming a battery, the cells being charged in series includes a voltage detection circuit to sense the actual voltage level of the individual cell. A voltage comparison circuit is used to compare the actual voltage level of the individual cell with a reference value and to provide an error signal representative thereof. A third circuit, designed to be responsive to the error signal, is provided for maintaining the individual cell voltage level generally equal to the specific voltage level. Circuitry is provided in the third circuit for bypassing charging current around the individual cell if the actual voltage level is above the specific voltage level and transfers the excess charging current to the power supply net work. The circuitry also allows charging of the individual cell if the actual voltage level is equal or less than the specific voltage level.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
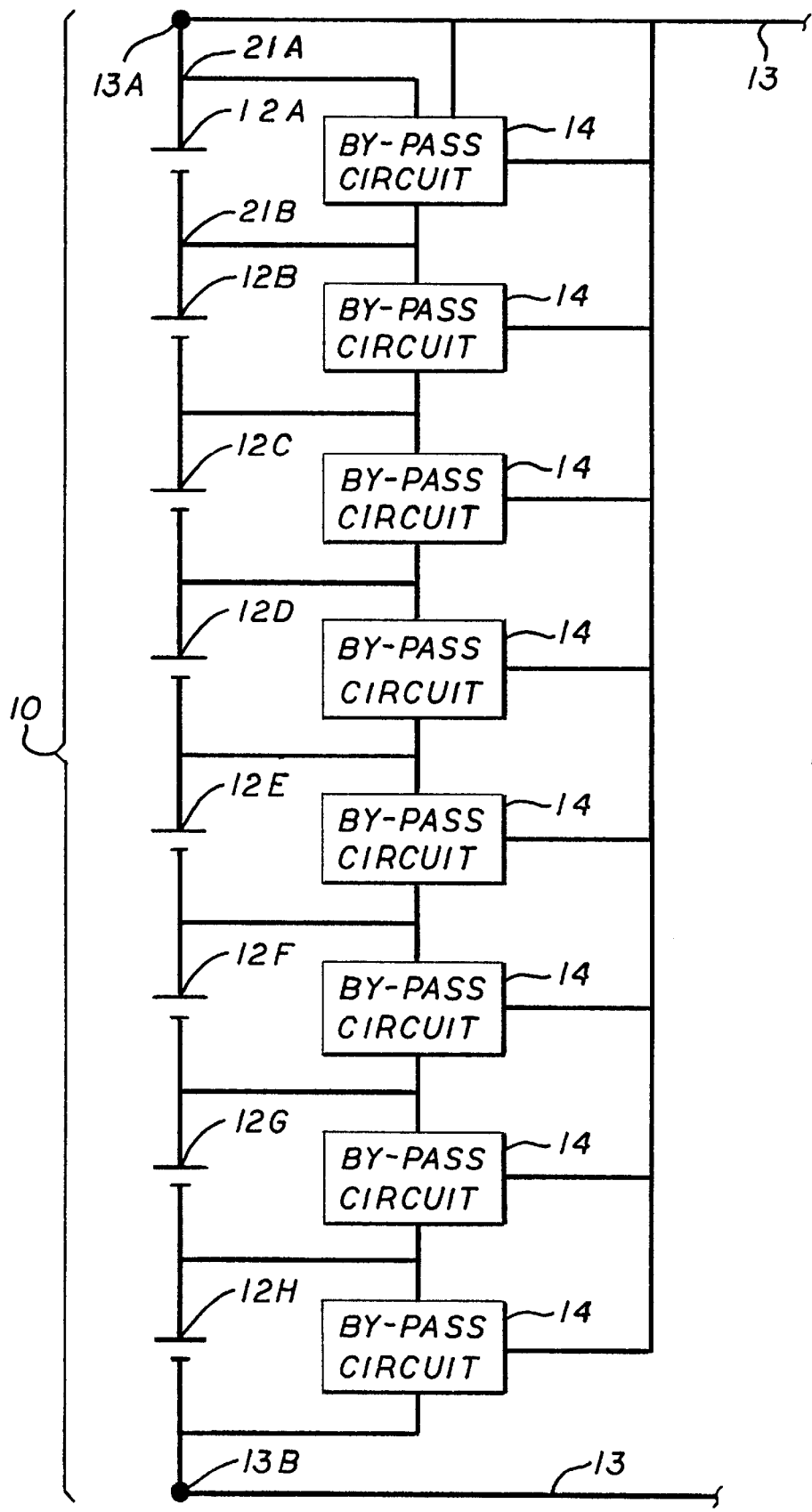
FIG. 1 is a block diagram of the battery system.
Figure 2:
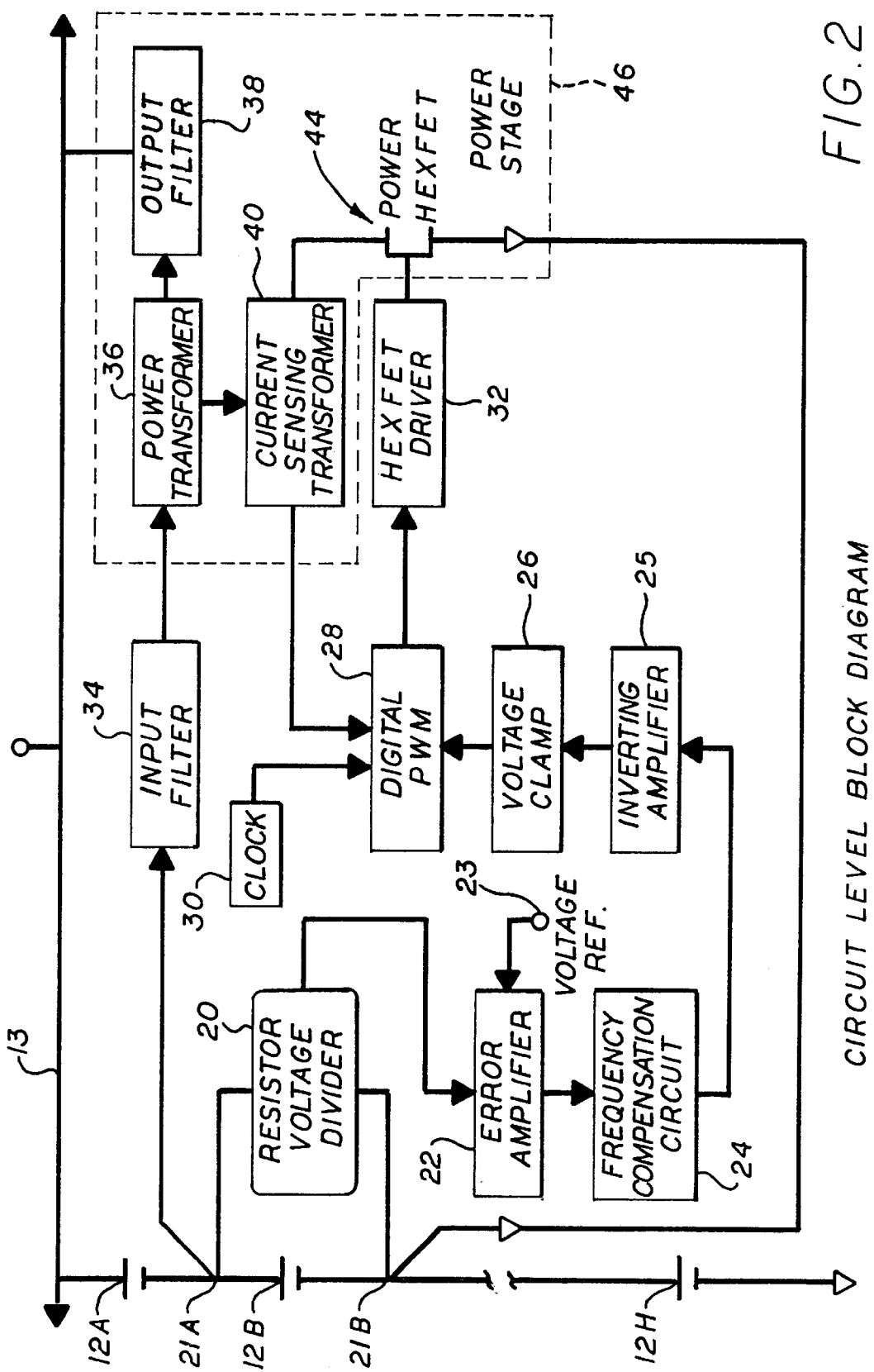
FIG. 2 is a block diagram of the current by-pass circuit.

Referring to FIGS. 1 and 2, a battery 10 is illustrated having eight cells 12A through 12H coupled to a bus 13 at terminals 13A and 13B. If these cells are Lithium-Ion cells, they can be damaged if subjected to over charging. In general terms, a power converter by-pass circuit 14 is coupled to each cell 12A–H of the battery 10 and prevents overcharging.

In further detail, the by-pass circuit 14 includes a voltage divider circuit 20 placed across each cell 12A–H at terminals 21A and 21B. The voltage divider circuit 20 is coupled to an error amplifier 22 that also receives input from a voltage reference 23. The error amplifier 22 is coupled to a frequency compensation circuit 24 which in turn is coupled to an inverting amplifier 25, which in turn is coupled to a voltage limiting circuit 26 (clamp circuit). A Digital pulse width modulator (PWM) circuit 28 receives the output from the voltage clamp circuit 26 and also a timing signal from the clock circuit 30 drives a Hexagonal field effect (HEXFET) driver circuit 32. The terminal 21A is connected to an input filter 34, power transformer 36 and output filter 38, all in series, with the output from the filter 38 connected to the bus 13. The power transformer 36 is also connected to a current sensing transformer 40. The output from the transformer 40 is feed to the PWM circuit 28 and to the input terminal of a hexagonal field effect transistor (HEXFET) 44. The output HEXFET 44 is connected to the terminal 21B of the battery cell. Finally, the output from the HEXFET driver circuit 32 is connected to the HEXFET 44.

What occurs is that when the battery cell has been charged to the proper voltage level the excess current is bypassed about the cell and returned to the buss at the proper voltage level. This is accomplished with the use of the high efficiency power converter that is embodied in the circuitry. The converter draws current around the cell through the power transformer via the PWM action. The power transformer transforms the current drawn from the cell and sends it to the buss for use by other loads on the buss, while at the same time reducing the thermal stresses on the circuitry.

Having physically described the bypass circuit 14, the functions of the individual components will be subsequently discussed. The voltage divider circuit 20 divides the cell voltage to a voltage level, such that it can be compared to the output from the voltage reference circuit 23 by Error amplifier circuit 22. The voltage reference circuit 23 provides a stable voltage against environmental factors such as heat. The stable voltage reference is used to determine when the cell will begin bypass current. The error amplifier circuit 22 compares the voltage reference with the cell voltage that has been modified by the voltage divider circuit 20. The Frequency compensation circuit 24 shapes the frequency such that the feedback control system that is formed by the bypass circuit has the correct gain and phase margins to produce a stable control system under all operating conditions.

The inverting amplifier 25 inverts the phase of the output signal from the error amplifier 22 such the bypass circuit begins to clamp the cell voltage via bypassing current around the cell when the voltage rises above the preset level. When the cell voltage is below the required level, the inverting amplifier 25 prevents the bypass circuit from bypassing current around the cell. The clamp circuit 26 limits the output voltage of the inverting amplifier circuit 25 to form an over current limit for the bypass circuit. The limit is set to allow for the maximum bypass current that the cell will require while at the same time is set low enough to prevent damage to the bypass circuit from over current conditions. This function is accomplished by reducing the duty cycle of the PWM signal from the PWM circuit 28 to the power HEXFET 44.

The PWM circuit 28, produces a pulse modulated signal that is sent to HEXFET 44. The PWM signal will have a frequency that is controlled by the clock circuit 30 and will vary it's duty cycle dependent on the value of the cell voltage and the power bus voltage 13. The PWM circuit 28 produces this signal by comparing the output of the clamp circuit 26 and current sensing transformer 40. When the output from the current sensing transformer 40 is equal to or greater than the output from the voltage clamp circuit 26, the PWM circuit 28 signal turns off the power to the HEXFET 44. The power HEXFET 44 turns on again during the next period of the clock circuit 30, and the cycle repeats. The PWM signal from the PWM circuit 28 is then routed to the HEXFET driver circuit 32 where it is voltage translated to the correct level to drive the power HEXFET 44. The HEXFET 44 turns power on and off to power stage of the circuit in response to the PWM signal.

The power transformer 36 processes the current from the cell therethrough. It converts it into the bus voltage via the secondary side of the transformer and the filter circuit 38. The filter circuit 38 converts the power into non-pulsating current. The input filter 34 prevents the pulsating current from the power HEXFET 44 from entering the Lithium Ion Cell and provides clean current draw out of the cell.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the battery charger manufacturing industry.

What is claimed is:

1. A method of limiting the charging current from a power supply applied to an individual cell of a plurality of cells making up a battery being charged in series, the method comprising the steps of:

sensing the actual voltage level of the individual cell;

comparing the actual voltage level of the individual cell with a specific voltage level and providing an error signal representative thereof;

by-passing the charging current around the individual cell necessary to keep the individual cell voltage level generally equal to said specific voltage level while continuing to charge the remaining cells; and transferring the by-passed current at a proper voltage level to the power supply.

2. The method as set forth in claim 1 wherein the step of by-passing the charging current around the individual cell necessary to keep the individual cell voltage level generally equal to said specific voltage level includes the steps of:

by-passing said charging current around said individual cell if said actual voltage level is above said specific voltage level; and allowing said charging current to charge said individual cell if said actual voltage level is equal or less than said reference level.

3. The method as set forth in claim 2 wherein said series of cells are Lithium-ion cells.

4. A by-pass circuit for limiting the charging current applied to an individual cell of a series of cells forming a battery, the cells being charged in series, the by-pass circuit comprising:

first means to sense the actual voltage level of the individual cell;

second means to compare the actual voltage level of the individual cell with a specific voltage level and to provide an error signal representative thereof;

third means responsive to said error signal for maintaining the individual cell voltage level generally equal to said reference level; and fourth means for transferring the by-passed current at a proper voltage level to the power supply.

5. The by-pass circuit as set forth in claim 4 wherein said third means includes:

means to by-pass said charging current around said individual cell if the actual voltage level is above said specific voltage level; and means to allow charging of the individual cell if the actual voltage level is equal or less than said specific voltage level.

6. The by-pass circuit as set forth in claim 5 wherein said first means is a voltage detection circuit.

* * * * *